(12) United States Patent
Ishikawa et al.

(10) Patent No.: US 6,333,576 B1
(45) Date of Patent: Dec. 25, 2001

(54) BRUSHLESS MOTOR FOR VEHICLE AIR CONDITIONER

(75) Inventors: Toshio Ishikawa, Kariya; Mineo Yamaguchi, Obu, both of (JP)

(73) Assignee: Asao Co., Ltd., Shizuoka (JP)

( * ) Notice: Subject to any disclaimer, the term of this patent is extended or adjusted under 35 U.S.C. 154(b) by 0 days.

(21) Appl. No.: 09/605,420

(22) Filed: Jun. 27, 2000

(30) Foreign Application Priority Data

Jun. 30, 1999 (JP) .................................................. 11-185670
May 9, 2000 (JP) .................................................. 12-136049

(51) Int. Cl.[7] .................................................. H02K 5/12
(52) U.S. Cl. .............................. 310/85; 310/89; 310/88; 310/67 R
(58) Field of Search .................................... 310/85, 67 R, 310/68 B, 89, 88, 91, 71, 90

(56) References Cited

U.S. PATENT DOCUMENTS

| | | | |
|---|---|---|---|
| 3,772,544 | * 11/1973 | Wrobel | 310/71 |
| 4,800,307 | * 1/1989 | Papst | 310/67 R |
| 5,006,742 | * 4/1991 | Strobl et al. | 310/88 |
| 5,363,003 | * 11/1994 | Harada et al. | 310/67 R |
| 5,635,781 | * 6/1997 | Moritan | 310/71 |
| 5,663,604 | * 9/1997 | Takahashi | 310/91 |
| 5,672,927 | * 9/1997 | Viskochil | 310/194 |
| 5,705,868 | * 1/1998 | Cox et al. | 310/71 |
| 5,895,994 | * 4/1999 | Molnar et al. | 310/215 |
| 5,969,445 | * 10/1999 | Horiuchi et al. | 310/64 |
| 6,121,700 | * 9/2000 | Yamaguchi et al. | 310/68 B |

* cited by examiner

Primary Examiner—Tran Nguyen
Assistant Examiner—Thanh Lam
(74) Attorney, Agent, or Firm—Law Offices of David G. Posz (57) ABSTRACT

A brushless motor for a vehicle air conditioner has a motor holder having an accommodation portion, a stator having a center piece fastened to a bottom of the accommodation portion and a core on which a winding is wound, and an exciting circuit disposed below the bottom to supply an exciting current to the winding. A terminal of the exciting circuit is upwardly extended to an upper side of the core through a through hole formed in the bottom and a terminal accommodation hole formed in the center piece to be connected to the winding. Liquid having entered the accommodation portion is restricted from falling through the through hole of the bottom by an O-ring disposed to surround the through hole and is drained through a drain opening formed in the bottom. As a result, a connection portion between the terminal and the winding and the exciting circuit are restricted from making contact with liquid.

16 Claims, 9 Drawing Sheets

BRUSHLESS MOTOR FOR VEHICLE AIR CONDITIONER

CROSS REFERENCE TO RELATED APPLICATIONS

This application relates to and claims priority from Japanese Patent Applications No. 11-185670 filed on Jun. 30, 1999 and No. 2000-136049 filed on May 9, 2000, the contents of which are hereby incorporated by reference.

BACKGROUND OF THE INVENTION

1. Field of the Invention

The present invention relates generally to vehicle air conditioners, and particularly to a brushless motor having an outer rotor and used as a blower motor for a vehicle air conditioner.

2. Related Art

Conventionally, a brushless motor having an outer rotor and used as a blower motor for a vehicle air conditioner is mounted on a vehicle so that a rotation shaft of the motor extends vertically and the outer rotor is rotated horizontally. The brushless motor has a motor holder having a recessed portion and a stator fastened to a bottom of the recessed portion. The stator has a center piece, a core and plural windings wound on the core. The center piece is fastened to an upper surface of a mount plate fastened to the bottom of the recessed portion. A rotation shaft vertically extending through the center piece is rotatably held by bearings attached to the center piece. A cup-shaped rotor yoke is fastened to an upper part of the rotation shaft to cover the stator. A lower end of the rotation shaft passes through a through hole formed in the bottom of the recessed portion to be disposed below the motor holder.

The motor has a circuit substrate disposed below the motor holder. An exciting circuit for generating an exciting current to be supplied to the winding is mounted on the circuit substrate. Each of three terminals of the exciting circuit is upwardly extended through the through hole of the motor holder and a through hole formed in the mount plate. Then, each of the terminals is further extended outwardly in a radial direction of the center piece and is connected to each of the windings at a lower side of the core.

The motor holder has a cylindrical waterproof wall upwardly extending from a periphery of an opening of the recessed portion. A lower case is attached to the motor holder from below to cover the circuit substrate. A fan is attached to the upper end of the rotation shaft. When an exciting current generated by the exciting circuit is supplied to the windings, the rotor is rotated. As the rotor is rotated, the fan is rotated to blow air.

The brushless motor sucks therein air outside a passenger compartment of the vehicle through a duct. Therefore, when the vehicle is washed in a high-pressure car washing machine with the motor driven, the motor may also suck liquid such as water therein. The waterproof wall substantially restricts liquid from entering the recessed portion of the motor holder. However, when a relatively large amount of liquid is sucked by the motor or when air flow generated by the fan affects liquid flow, liquid may enter the recessed portion and make contact with each connection portion between the terminals and the windings. As a result, a short circuit between adjacent connection portions may occur. Further, liquid having entered the recessed portion may flow downwardly toward the circuit substrate through the through hole of the motor holder to cause various malfunctions of the motor.

SUMMARY OF THE INVENTION

In view of the foregoing problems, it is an object of the present invention to provide a brushless motor for a vehicle air conditioner sufficiently waterproofed to avoid failure.

According to the present invention, a brushless motor has a holder and a stator having a center piece fastened to an upper surface of the holder, a core fastened to an outer peripheral portion of the center piece and a winding wound on the core through an insulator. A shaft is rotatably held by an inner peripheral portion of the center piece. A rotor is disposed to cover the stator from above and is rotated centered on the rotation shaft by a magnetic field generated by the stator. An exciting circuit is disposed below the holder to supply an exciting current to the winding through a through hole of the holder. The exciting circuit has a terminal extending to an upper side of the core through a route within the core. The terminal has a connector portion formed at an upper part thereof and connectable to the winding.

As a result, a connection portion between the terminal and the winding is disposed at an upper side of the core. Therefore, even when liquid such as water enters the holder and flows on the upper surface of the holder, the connection portion between the terminal and the winding is restricted from making contact with liquid. As a result, failure of the motor is restricted.

Preferably, flow restriction means is disposed on the holder for restricting a liquid from flowing downwardly through the through hole of the holder. Further, a case is disposed below the holder to accommodate the exciting circuit, and the holder has a drain opening through which a liquid on the upper surface of the holder is drained outside the case. As a result, even when liquid enters the holder and flows on the upper surface of the holder, liquid is restricted from flowing downwardly through the through hole of the holder by the flow restriction means and is drained outside the case through the drain opening.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

First Embodiment

A first preferred embodiment of the present invention will be described with reference to FIGS. 1–7.

Figure 1:
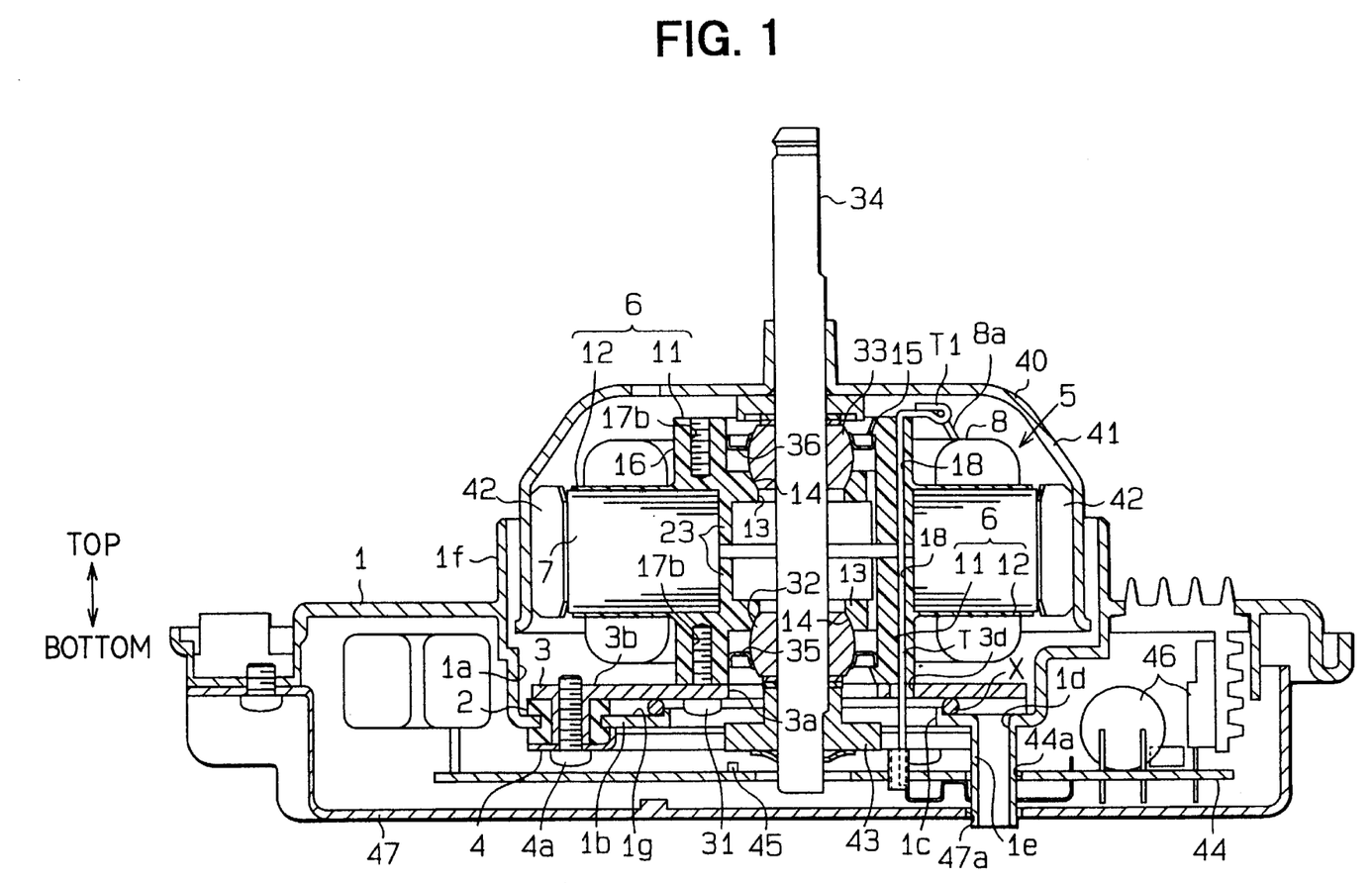
FIG. 1 is a schematic sectional view showing a brushless motor according to a first preferred embodiment of the present invention.

As shown in FIG. 1, a brushless motor for a vehicle air conditioner has a motor holder 1. The motor holder 1 has a circular accommodation portion 1a formed to be recessed at a center thereof. A bottom 1b of the accommodation portion 1a has a through hole 1c at a center thereof and a drain opening 1d. A drain pipe 1e is connected to the drain opening 1d and extends downwardly to a predetermined position. The motor holder 1 also has a waterproof wall 1f which extends upwardly from a periphery of an opening of the accommodation portion 1a.

A substantially disc-shaped mount plate 3 is mounted to an upper surface of the bottom 1b through plural rubber mounting members 2. In FIG. 1, only one of the mounting members 2 is shown. The mount plate 3 is fastened to a back plate 4 disposed below the motor holder 1 through a screw 4a. The mount plate 3 has a center hole 3a having a diameter smaller than that of the through hole 1c at a center thereof. Further, a rubber O-ring X is disposed on the upper surface 1g of the bottom 1b to surround the through hole 1c. When the mount plate 3 is fastened, the O-ring X is clamped between the upper surface 1g of the bottom 1b and a lower surface of the mount plate 3.

A stator 5 is fastened to an upper surface 3b of the mount plate 3. The stator 5 has upper and lower center pieces 6 made of electrically insulating synthetic resin, a core 7 disposed at outer peripheral portions of the upper and lower center pieces 6 to be held between the upper and lower center pieces 6 and three windings 8 wound on the core 7. The upper and lower center pieces 6 have the same shape. Therefore, a structure of only the lower center piece 6 is described in detail with reference to FIGS. 2, 3, 5 and 6.

Figure 2:
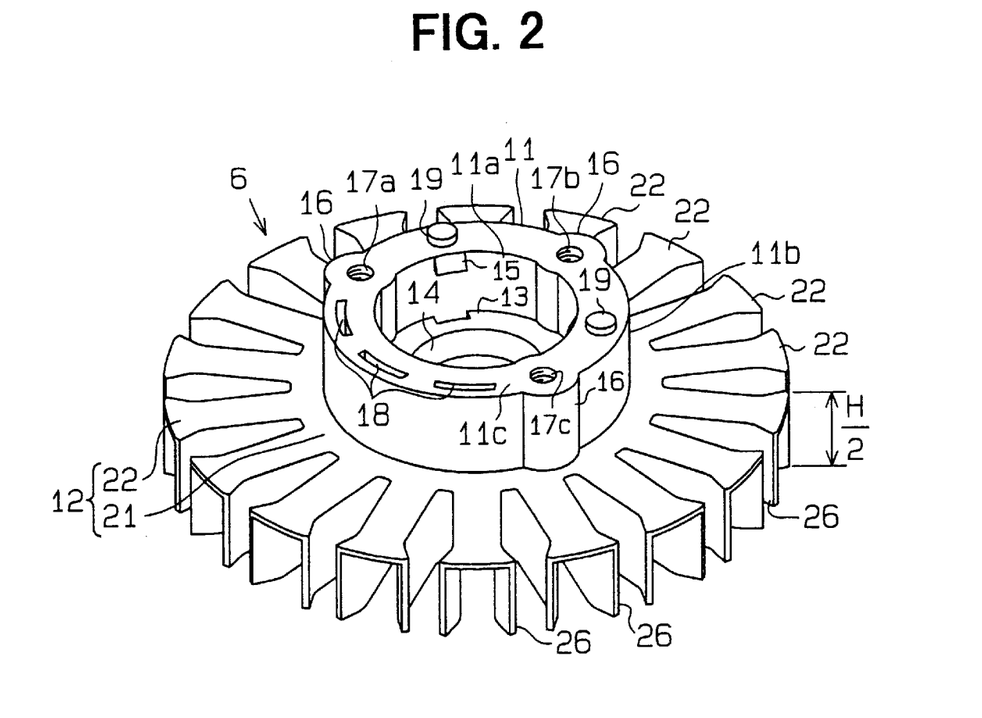
FIG. 2 is a perspective view showing a center piece of the brushless motor according to the first embodiment.
Figure 3:
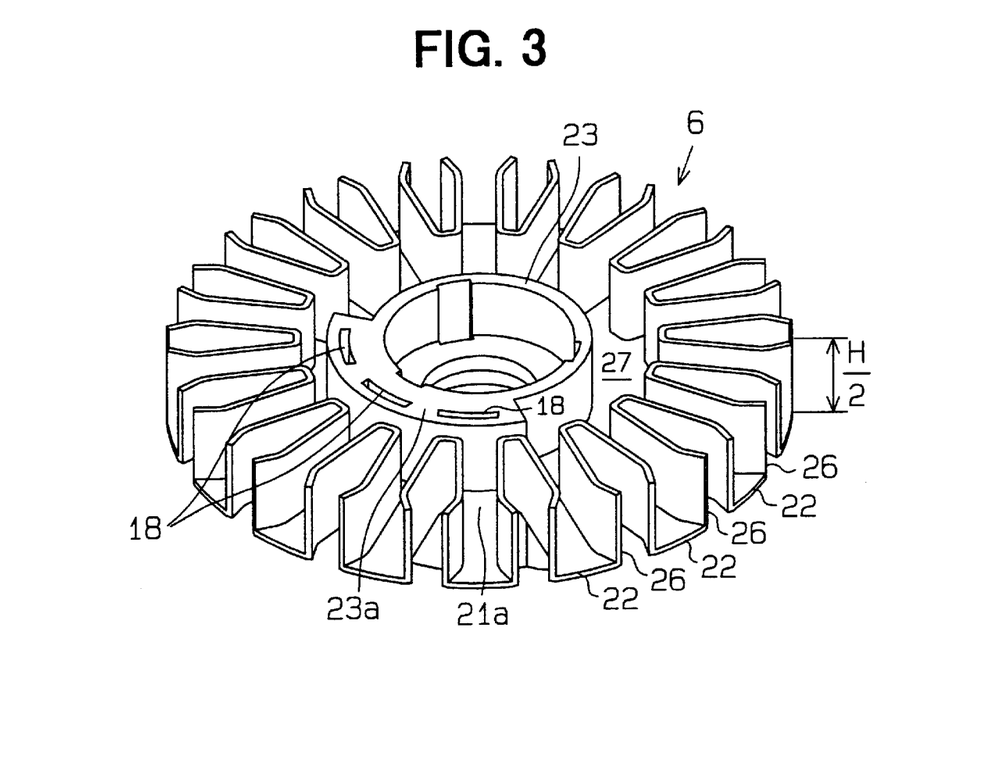
FIG. 3 is a perspective view showing the center piece according to the first embodiment.

In FIG. 2, the lower center piece 6 is shown with one side of the lower center piece 6 on which the core 7 is not mounted (hereinafter referred to as the opposite-core side) facing up. In FIG. 3, the lower center piece 6 is shown with the other side of the lower center piece 6 on which the core 7 is mounted (hereinafter referred to as the core side) facing up. As shown in FIG. 2, the lower center piece 6 has a substantially cylindrical center boss 11 and an insulator 12 disposed outside the boss 11 in a radial direction of the boss 11. The boss 11 has an annular bearing holder 13 formed to extend from a core-side end of an inner circumferential wall 11a of the boss 11 inwardly in a radial direction of the boss 11. Further, as shown in FIG. 6, an inner circumferential wall of the bearing holder 13 surrounding an opening of the bearing holder 13 is partially cut out at an opposite-core-side end thereof to form a bearing holding surface 14 having an arc-shaped cross-section.

Figure 5:
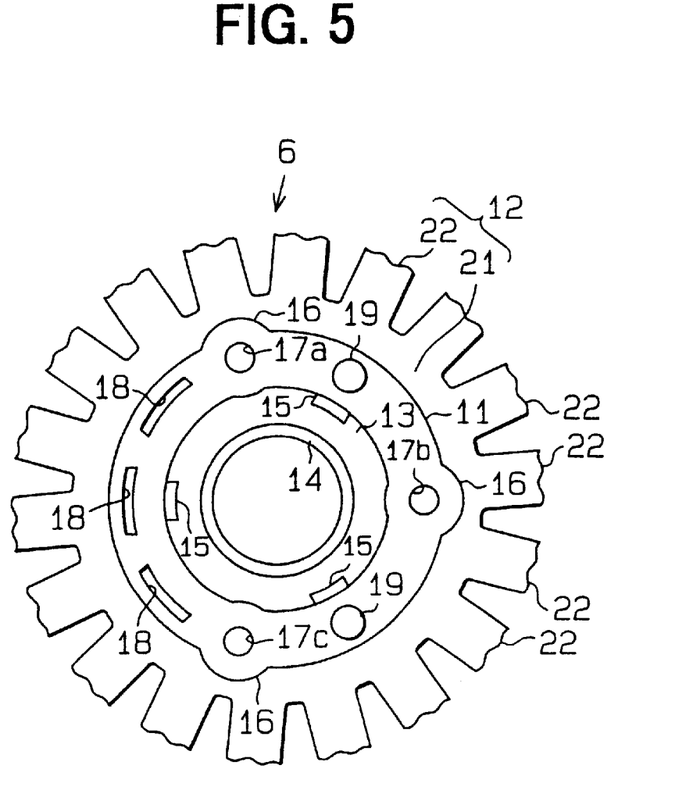
FIG. 5 is a partial plan view showing the center piece according to the first embodiment.
Figure 6:
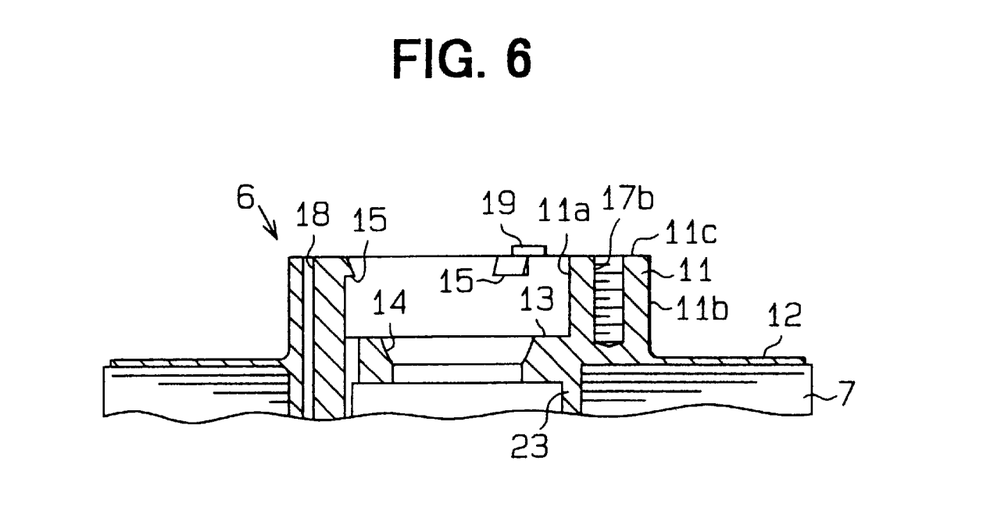
FIG. 6 is a partial schematic sectional view showing the center piece according to the first embodiment.

As shown in FIGS. 5 and 6, three claws 15 are formed at an opposite-core-side end of the inner circumferential wall 11a of the boss 11 at equal angles to protrude inwardly in a radial direction of the boss 11. Three widened portions 16 are formed on an outer circumferential wall 11b of the boss 11 by bulging to extend in an axial direction of the boss 11 and have a circular cross-section. The three widened portions 16 respectively have threaded holes 17a, 17b and 17c at centers thereof. Further, three terminal accommodation holes 18 are formed between the threaded holes 17a and 17c to extend from an opposite-core-side end surface 11c to a core-side end surface of the boss 11, thereby penetrating the boss 11. As shown in FIGS. 2 and 5, the boss 11 has two positioning protrusions 19 protruding toward the opposite-core side. One of the positioning protrusions 19 is disposed at a mid position between the threaded holes 17a and 17b and the other is disposed at a mid position between the threaded holes 17b and 17c.

As shown in FIG. 2, the insulator 12 outwardly extends from a core-side end of the outer circumferential wall 11b of the boss 11. The insulator 12 has an annular base plate 21 disposed next to core-side end of the outer circumferential wall 11b of the boss 11 and eighteen tooth plates 22 disposed at equal angles to extend from the base plate 21 outwardly in a radial direction of the boss 11. Further, as shown in FIG. 3, a cylindrical portion 23 is formed to protrude from a core-side surface 21a of the base plate 21 in an axial direction of the boss 11 and to communicate with the boss 11. The cylindrical portion 23 has a fan-shaped portion 23a formed by enlarging the cylindrical portion 23 outwardly in a radial direction of the cylindrical portion 23. The fan-shaped portion 23a is formed at a position corresponding to the terminal accommodation holes 18. Each of the terminal accommodation holes 18 is extended to be opened in a core-side end surface of the fan-shaped portion 23.

As shown in FIG. 2, each outer end of the tooth plates 22 in a radial direction of the boss 11 is enlarged. Further, a wall portion 26 is formed to extend from the base plate 21 and the tooth plates 22 toward the core side. That is, the wall portion 26 extends from both sides of each of the tooth plates 22 in a circumferential direction of the insulator 12 and an outer periphery of the base plate 21 between the adjacent tooth plates 22. As shown in FIG. 3, the base plate 21, the tooth plates 22, the wall portion 26 and the cylindrical portion 23 form an engaging recessed portion 27 into which the core 7 is accommodated.

Figure 4:
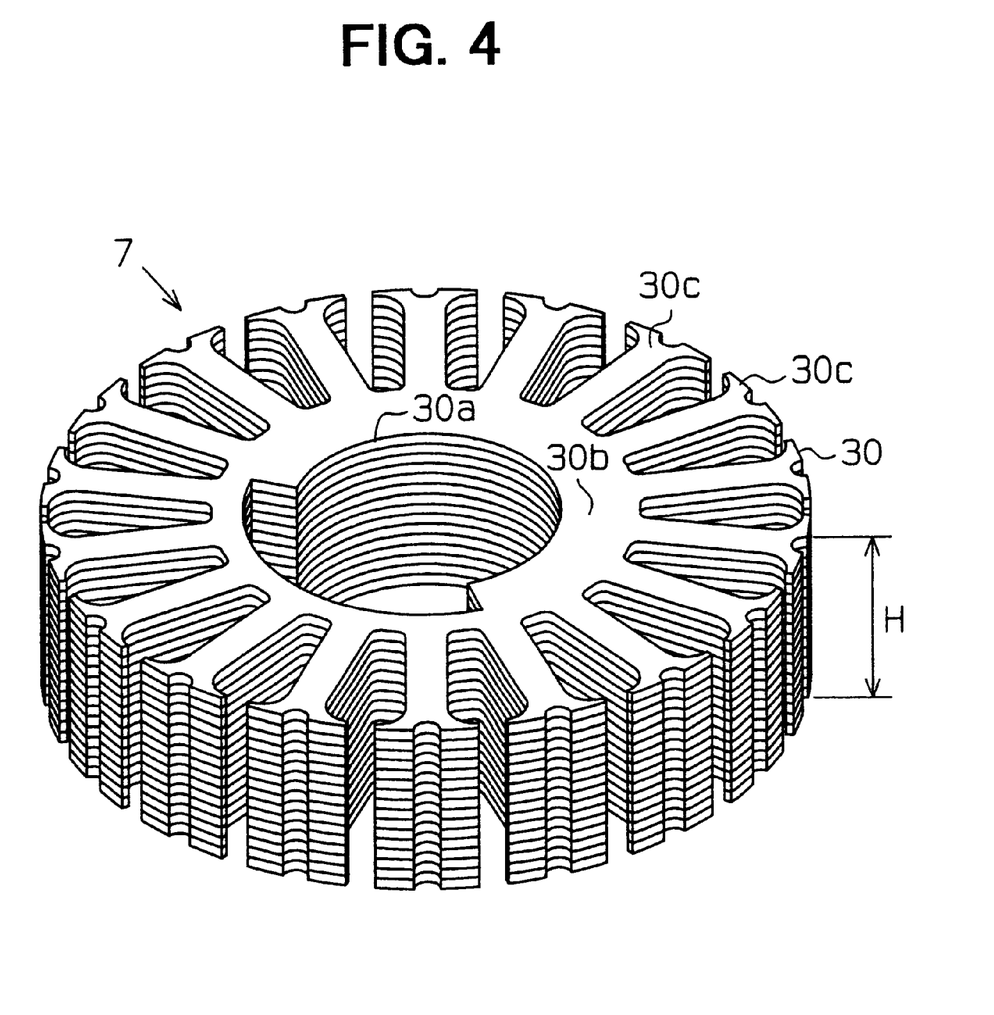
FIG. 4 is a perspective view showing a core of the brushless motor according to the first embodiment.

As shown in FIG. 4, the core 7 is formed by laminating plural core sheets 30. Each of the core sheets 30 has an annular base portion 30b forming an engaging hole 30a at a center thereof and plural tooth portions 30c disposed at equal angles to extend from an outer periphery of the base portion 30b outwardly in a radial direction of the base portion 30b. The engaging hole 30a is formed into a shape corresponding to that of the cylindrical portion 23. A flat shape of each of the core sheets 30 corresponds to that of the engaging recessed portion 27 except a recessed portion formed at each outer end of the tooth portions 30c in a radial direction of the core sheets 30. As a result, the core 7 is nested in the engaging recessed portion 27. When the core sheets 30 are nested in the engaging recessed portion 27, the base portions 30b are disposed on the base plate 21 and each of the tooth portions 30c are disposed on each of the tooth plates 22.

As shown in FIGS. 3 and 4, the number of the core sheets 30 is determined so that the core 7 has a height H which is twice as large as a height H/2 of the wall portion 26. One half of the core sheets 30 are nested in the engaging recessed portion 27 of the lower center piece 6, and the other half of the core sheets 30 are nested in the engaging recessed portion 27 of the upper center piece 6. The upper and lower center pieces 6 are connected to each other with the core sheets 30 being nested in the engaging recessed portions 27 of the upper and lower center pieces 6. At this point, each of the terminal accommodation holes 18 of the upper center piece 6 is positioned to coincide with that of the lower center piece 6. After the upper and lower center pieces 6 are connected to each other, the windings 8 are wound on the core 7. As a result, the windings 8 are disposed in plural slots formed between the adjacent tooth plates 22, and the stator 5 is formed.

Figure 7:
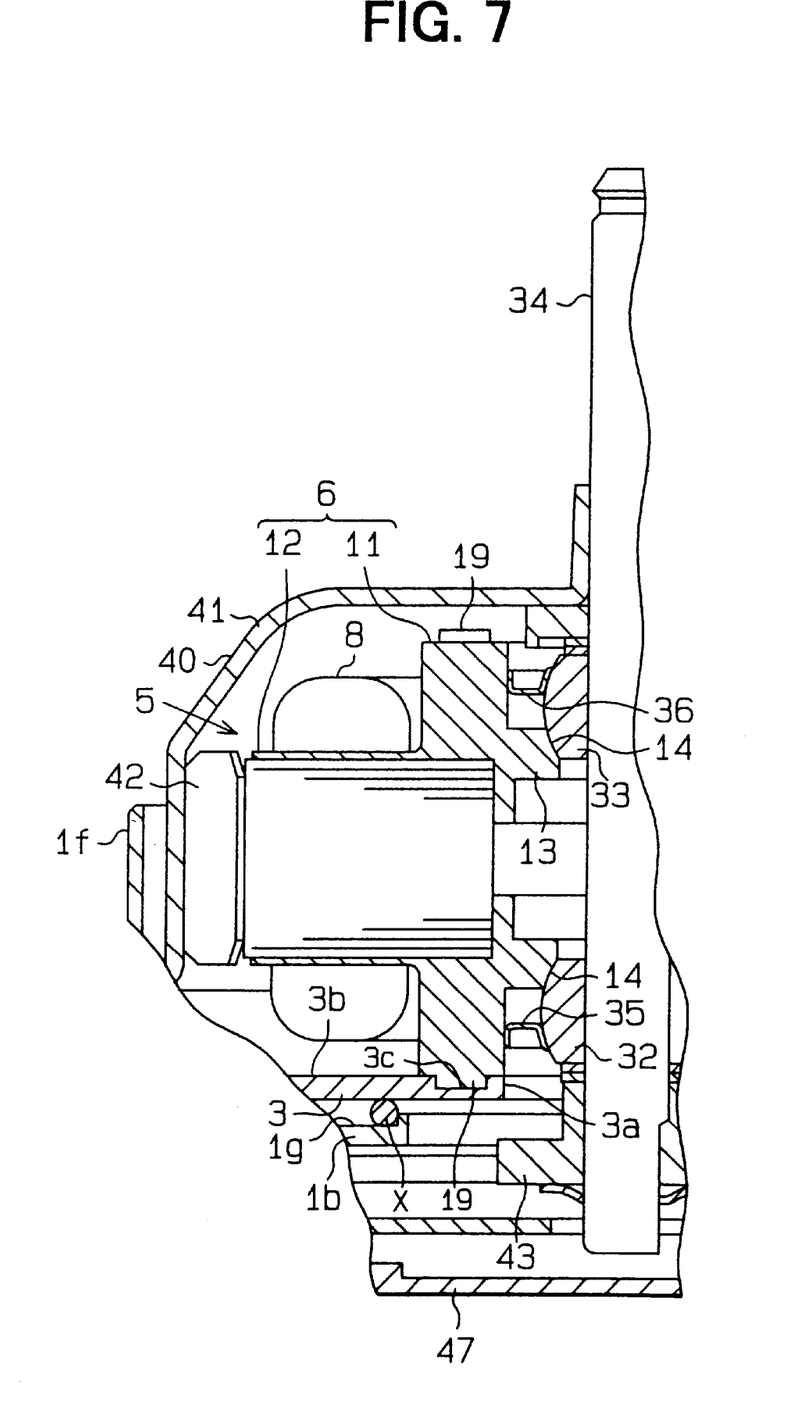
FIG. 7 is a partial schematic sectional view showing the brushless motor according to the first embodiment.

As shown in FIG. 7, each of the positioning protrusions 19 of the lower center piece 6 is engaged with a respective positioning recess 3c formed in the mount plate 3, thereby positioning the stator 5 with respect to the mount plate 3. After being positioned, as shown in FIG. 1, the stator 5 is fastened to the mount plate 3 by three screws 31 respectively threaded into the threaded holes 17a–17c of the lower center piece 6 from below the mount plate 3. In FIG. 1, only the threaded hole 17b is shown. As shown in FIG. 1, the mount plate 3 has three through holes 3d each of which is disposed at a position corresponding to each of the three terminal accommodation holes 18. A diameter of the through hole 1c of the motor holder 1 is determined so that the through holes 3d of the mount plate 3 are disposed inside the through hole 1c in a radial direction of the through hole 1c.

Each of three terminals T is accommodated in each of the three terminal accommodation holes 18. Each of the terminals T has a connector portion T1 at an upper end thereof in FIG. 1. A winding end 8a of each of the windings 8 is used for generating a predetermined magnetic field and is connected to the connector portion T1 of each of the terminals T. The windings 8 are wound on the core 7 so that the winding end 8a of each of the windings 8 is disposed above the core 7. Each of the terminals T passes through each of the through holes 3d of the mount plate 3 and the through hole 1c of the motor holder 1 so that a lower end of each of the terminals T is disposed below the motor holder 1. The lower end of each of the terminals T is connected to an exciting circuit 46 disposed below the motor holder 1, and each of the terminals T is used as an output terminal of the exciting circuit 46.

As shown in FIG. 1, a rotation shaft 34 is rotatably held by the stator 5 through lower and upper spherical bearings 32, 33. As shown in FIG. 7, the lower bearing 32 is disposed to make contact with the bearing holding surface 14 of the lower center piece 6. A lock washer 35 is disposed at a lower side of the lower bearing 32 and is engaged with each of the claws 15 so that the lower bearing 32 is held between the bearing holder 13 and the lock washer 35. The upper bearing 33 is disposed to make contact with the bearing holding surface 14 of the upper center piece 6. A lock washer 36 is disposed at an upper side of the upper bearing 33 and is engaged with each of the claws 15 so that the upper bearing 33 is held between the bearing holder 13 and the lock washer 36.

As shown in FIGS. 1 and 7, a rotor 40 is fastened to an upper part of the rotation shaft 34. The rotor 40 has a cup-shaped yoke 41 which covers the stator 5. A lower peripheral end of the yoke 41 is disposed inside the waterproof wall if in a radial direction of the waterproof wall if so that a relatively small gap is formed between the yoke 41 and the waterproof wall if. Plural magnets 42 are attached to an inner wall of the yoke 41. A lower end of the rotational shaft 34 extends through the center hole 3c of the mount plate 3 and the through hole 1c of the motor holder 1 to be disposed below the motor holder 1. A sensor magnet 43 is attached to a lower part of the rotation shaft 34.

As shown in FIG. 1, a circuit substrate 44 is disposed below the motor holder 1. A Hall element 45 for detecting a magnetic flux of the sensor magnet 43 and the exciting circuit 46 for generating an exciting current to be supplied to the windings 8 are mounted on the circuit substrate 44. A rotation angle of the rotor 40 is detected by detecting a magnetic flux of the sensor magnet 43 by the Hall element 45. The exciting circuit 45 controls generation of an exciting current based on the detected signal. The circuit substrate 44 has a hole 44a at a position corresponding to the drain pipe 1e. When the circuit substrate 44 is mounted, the drain pipe 1e is inserted into the hole 44a and a lower end of each of the terminals T is connected to the exciting circuit 46.

Further, as shown in FIG. 1, a lower case 47 is attached to the motor holder 1 from below to cover the circuit substrate 44. The lower case 47 has a hole 47a formed at a position corresponding to the drain pipe 1e so that the drain pipe 1e is inserted into the hole 47a. As a result, the accommodation portion 1a communicates with a space outside and below the lower case 47 through the drain pipe 1e. Further, a fan (not shown) is fastened to an upper end of the rotation shaft 34. The brushless motor according to the first embodiment is mounted on the vehicle so that the rotation shaft 34 extends vertically and the rotor 49 rotates horizontally.

When an exciting current generated by the exciting circuit 46 is supplied to the windings 8, a rotational magnetic field is generated in the stator 5. As a result, the rotor 40 is rotated to rotate the fan so that air is blown. When the vehicle is washed in a high-pressure car washing machine with the air conditioner turned on, liquid such as water may be sucked into the brushless motor through the duct. Sucked liquid is substantially restricted from entering the accommodation portion 1a by the waterproof wall 1f. Liquid having been not blocked by the waterproof wall 1f and entered the accommodation portion 1a flows on the upper surface 1g of the bottom 1b. However, in the first embodiment, since the O-ring X is disposed to surround the through hole 1c, liquid is restricted from falling downwardly toward the circuit substrate 44 through the through hole 1c. Also, liquid having entered the accommodation portion 1a is drained outside through the drain opening 1d and the drain pipe 1e.

Further, in the first embodiment, each of the terminals T is extended through each of the terminal accommodation holes 18 to an upper side of the core 7, and the connector portion T1 of each of the terminals T is connected to the winding end 8a of each of the windings 8 above the core 7 while the connector portion T1 is covered by the yoke 41. Therefore, the connector portion T1 is restricted from making contact with liquid. The terminal accommodation holes 18 are disposed inside a core area, that is, an area within a circle defined by connecting each outer end of the tooth portions 30c of the core 7.

According to the first embodiment, the connector portion T1 of each of the terminals T is disposed above the core 7. Therefore, even when liquid such as water enters the accommodation portion 1a, the connector portion T1 is restricted from making contact with liquid, and a short circuit between adjacent connector portions T1 is restricted. Further, each of the terminals T extends to an upper side of the core 7 through the through hole 1c of the motor holder 1, the center hole 3c of the mount plate 3 and one of the terminal accommodation holes 18 formed in the upper and lower center pieces 6. Therefore, each of the terminals T is not exposed outside the lower center piece 6 and is restricted from making contact with liquid.

Further, the O-ring X is disposed to be clamped between the upper surface 1g of the bottom 1b and the lower surface of the mount plate 3. Therefore, liquid having entered the accommodation portion 1a is blocked by the O-ring X and is restricted from flowing downwardly through the through hole 1c toward the circuit substrate 44. As a result, the circuit substrate 44 is restricted from making contact with liquid. Also, since the O-ring X is made of rubber, the O-ring X adheres to the upper surface 1g of the bottom 1b and the lower surface of the mount plate 3 to create no gap between the upper surface 1g of the bottom 1b and the lower surface of the mount plate 3. Therefore, liquid is securely blocked by the O-ring X. Moreover, since the O-ring X bends, a distance between the upper surface 1g of the bottom 1b and the lower surface of the mount plate 3 does not need to be set with a high accuracy. Therefore, a high dimension accuracy or a high assembly accuracy of the parts is not required.

Further, liquid having entered the accommodation portion 1a is drained outside the lower case 47 through the drain opening 1d formed in the bottom 1b of the motor holder 1. Therefore, liquid is restricted from staying in the accommodation portion 1a, and various malfunctions caused by liquid staying in the accommodation portion 1a are avoided. Also, the drain pipe 1e extends simply downwardly from the drain opening 1d through the hole 44a of the circuit substrate 44 and the hole 47a of the lower case 47. Therefore, the drain pipe 1e does not need to be formed into a complicated shape but is readily formed.

Moreover, the gap between the lower peripheral end of the yoke 41 and the accommodation portion 1a is set relatively small, and the waterproof wall 1f is formed to surround the opening of the accommodation portion 1a. Therefore, liquid is substantially restricted from entering the accommodation portion 1a.

In the first embodiment, each of the upper and lower center pieces 6 is formed by the boss 11 and the insulator 12. The core 7 is inserted into the engaging recessed portion 27 formed in the lower center piece 6, and then the engaging recessed portion 27 formed in the upper center piece 6 engages with the core 7 so that the core 7 is disposed in the upper and lower center pieces 6. Therefore, the core 7 does not need to be press-fit into the upper and lower center pieces 6, thereby facilitating an assembly process. Further, since the core 7 is not press-fit into the upper and lower center pieces 6, the upper and lower center pieces 6 do not need to be made of expensive material having a high strength. As a result, a manufacturing cost of the motor is reduced.

Furthermore, since the windings 8 are wound on the core 7 so that the winding end 8a of each of the windings 8 is disposed at an upper side of the core 7, each of the windings 8a does not need to be extended from a lower part to an upper part of the core 7 to be connected to the connector portion T1 of each of the terminals T. Therefore, a connection process of the windings 8 with the terminals T is facilitated. Further, a necessary length of each of the windings 8 is reduced so that a material cost of the motor is reduced.

Second Embodiment

A second preferred embodiment of the present invention will be described with reference to FIGS. 8 and 9. In this and following embodiments, components which are substantially the same as those in previous embodiments are assigned the same reference numerals. In the second embodiment, the upper and lower center pieces 6 and the core 7 in the first embodiment are respectively replaced with a center piece 51 and a core 55.

Figure 8:
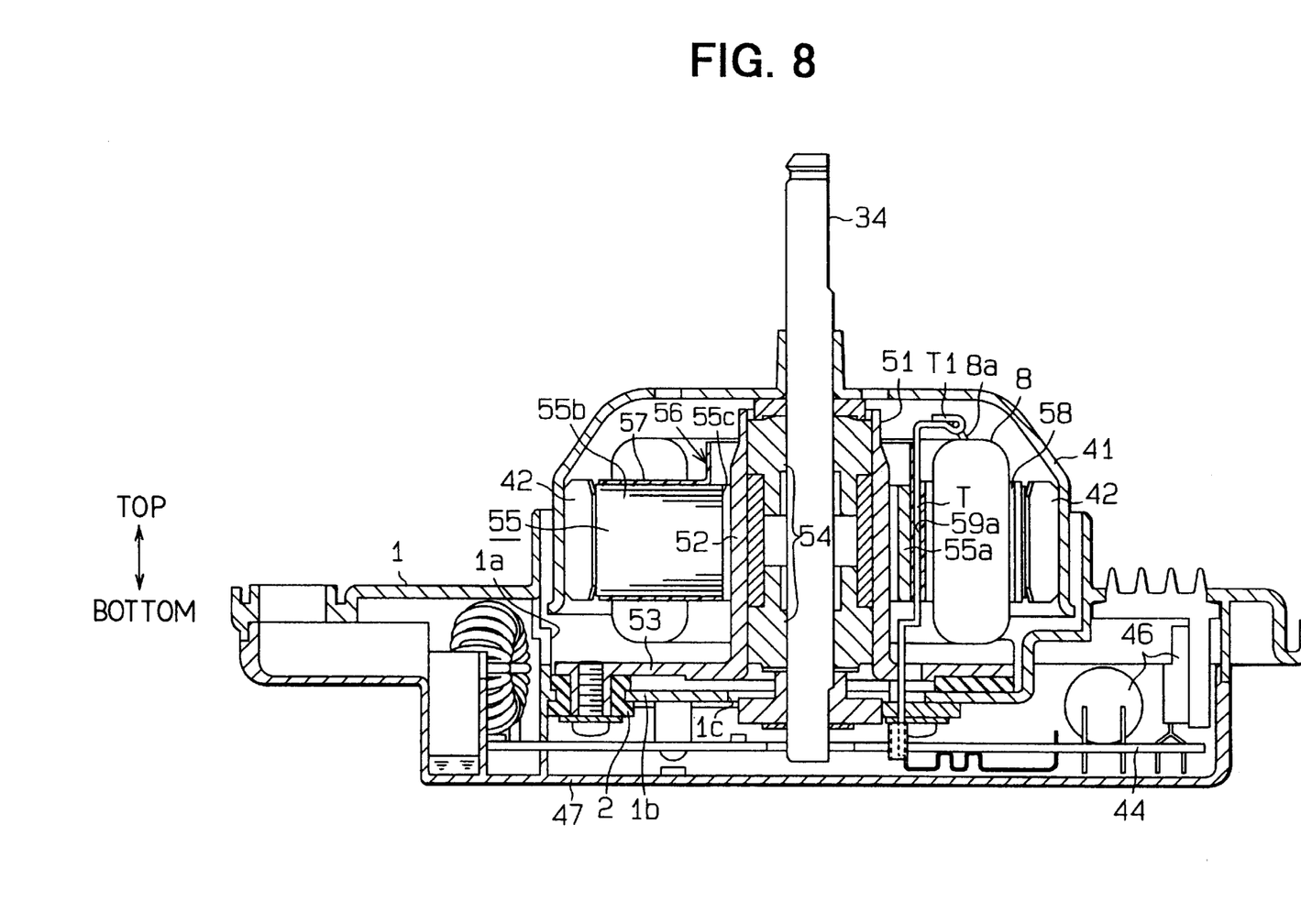
FIG. 8 is a schematic sectional view showing a brushless motor according to a second preferred embodiment of the present, invention.
Figure 9:
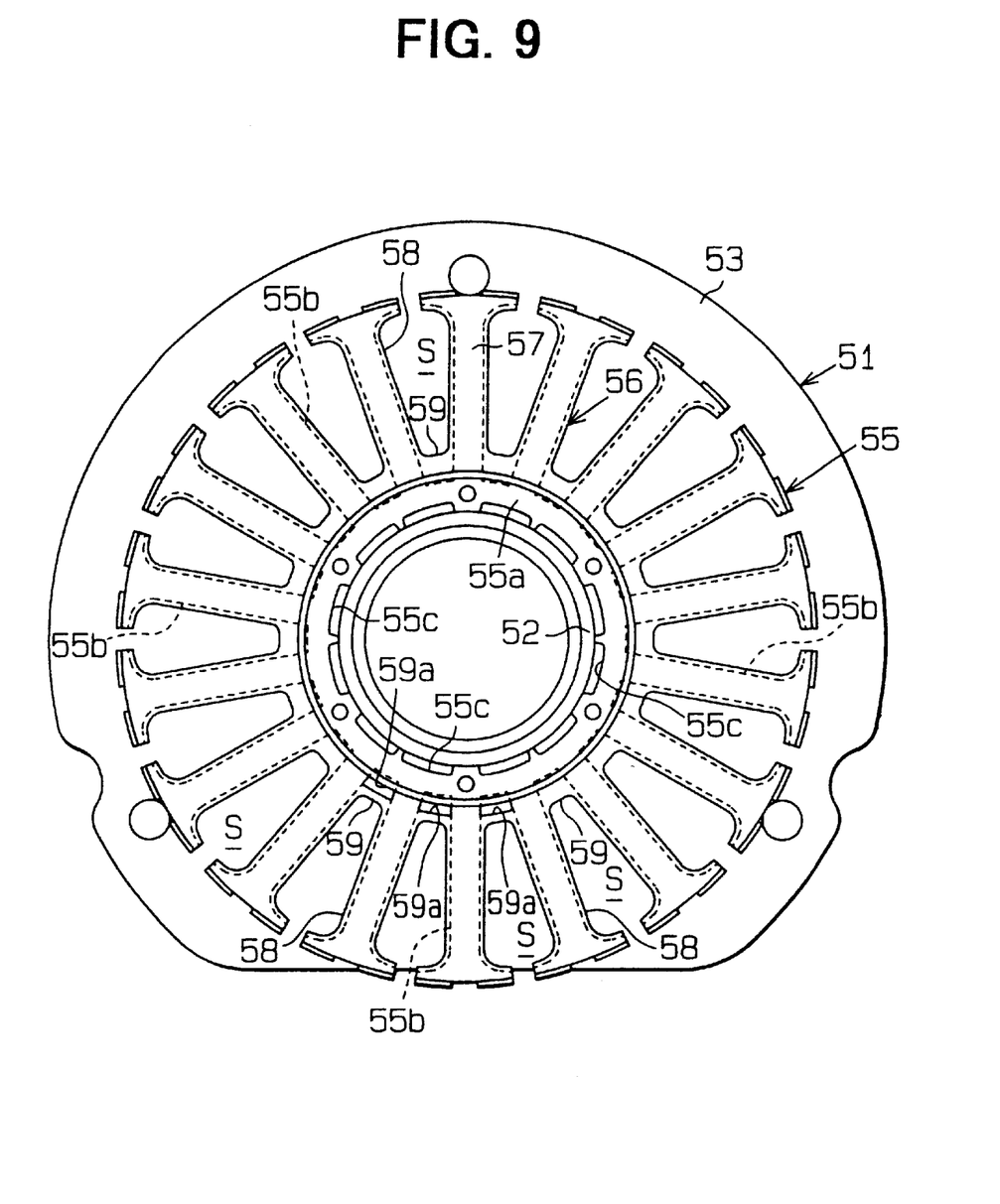
FIG. 9 is a plan view showing a center piece, a core and an insulator of the brushless motor according to the second embodiment.

As shown in FIG. 8, the center piece 51 is made of metal and is formed by pressing to have a cylindrical portion 52 and a flange portion 53 extending from a lower end of the cylindrical portion 52 outwardly in a radial direction of the cylindrical portion 52. The flange portion 53 is fastened to the bottom 1b of the accommodation portion 1a through the mounting members 2. In the second embodiment, the drain opening 1d is not formed in the bottom 1b. Upper and lower bearings 54 are attached to an inner circumferential wall of the cylindrical portion 52 so that the rotation shaft 34 is rotatably held by the upper and lower bearings 54. The cylindrical portion 52 is press-fit into an opening of the core 55.

The core 55 is formed by laminating plural core sheets. As shown in FIG. 9, the core 55 has a cylindrical base portion 55a into which the cylindrical portion 52 is press-fit, and plural tooth portions 55b extending at equal angles from an outer circumferential wall of the base portion 55a outwardly in a radial direction of the base portion 55a. Plural ventilation recesses 55c are formed in an inner circumferential wall of the base portion 55a, arranged in a circumferential direction of the base portion 55a. Each of the ventilation recesses 55a extends from an upper end to a lower end of the base portion 55a. When the cylindrical portion 32 is press-fit into the base portion 55a, the ventilation recesses 55c and an outer circumferential wall of the cylindrical portion 52 form plural ventilation holes extending from an upper end to a lower end of the core 55 in an axial direction of the core 55.

An insulator 56 is fastened to the core 55. The insulator 56 has an end surface covering portion 57 for covering upper and lower end surfaces of the core 55, a slot side wall covering portion 58 for covering side walls of each of the tooth portions 55b in a circumferential direction of the core 55 and a slot inner wall covering portion 59 for covering the outer circumferential wall of the base portion 55a between adjacent tooth portions 55b. As shown in FIG. 9, the slot inner wall covering portion 59 has three through holes 59a respectively disposed opposite the three slots S and extending from an upper end to a lower end of the core 55 in an axial direction of the core 55. As shown in FIG. 8, each of the terminals T extends through each of the through holes 59a to an upper side of the core 55. The connector portion T1 of each of the terminals T is connected to the winding end 8a of each of the windings 8.

According to the second embodiment, each of the terminals T of the exciting circuit 46 extends to an upper side of the core 55 through each of the though holes 59a so that each of the connector portions T1 is connected to each of the winding ends 8a. Therefore, even when liquid enters the accommodation portion 1a, each of the connector portions T1 is restricted from making contact with liquid. As a result, short circuit between the adjacent connector portions T1 is restricted. Further, the center piece 51 has the cylindrical portion 52 press-fit into the core 55 and the flange portion 53 extending from the cylindrical portion 52 and connected to the motor holder 1. Therefore, the center piece 51 and the core 55 are fastened to the motor holder 1 with the reduced number of parts.

Third Embodiment

A third preferred embodiment of the present invention will be described with reference to FIGS. 10 and 11. In the third embodiment, the upper and lower center pieces 6 and the core 7 in the first embodiment are respectively replaced with a center piece 71 and a core 75.

Figure 10:
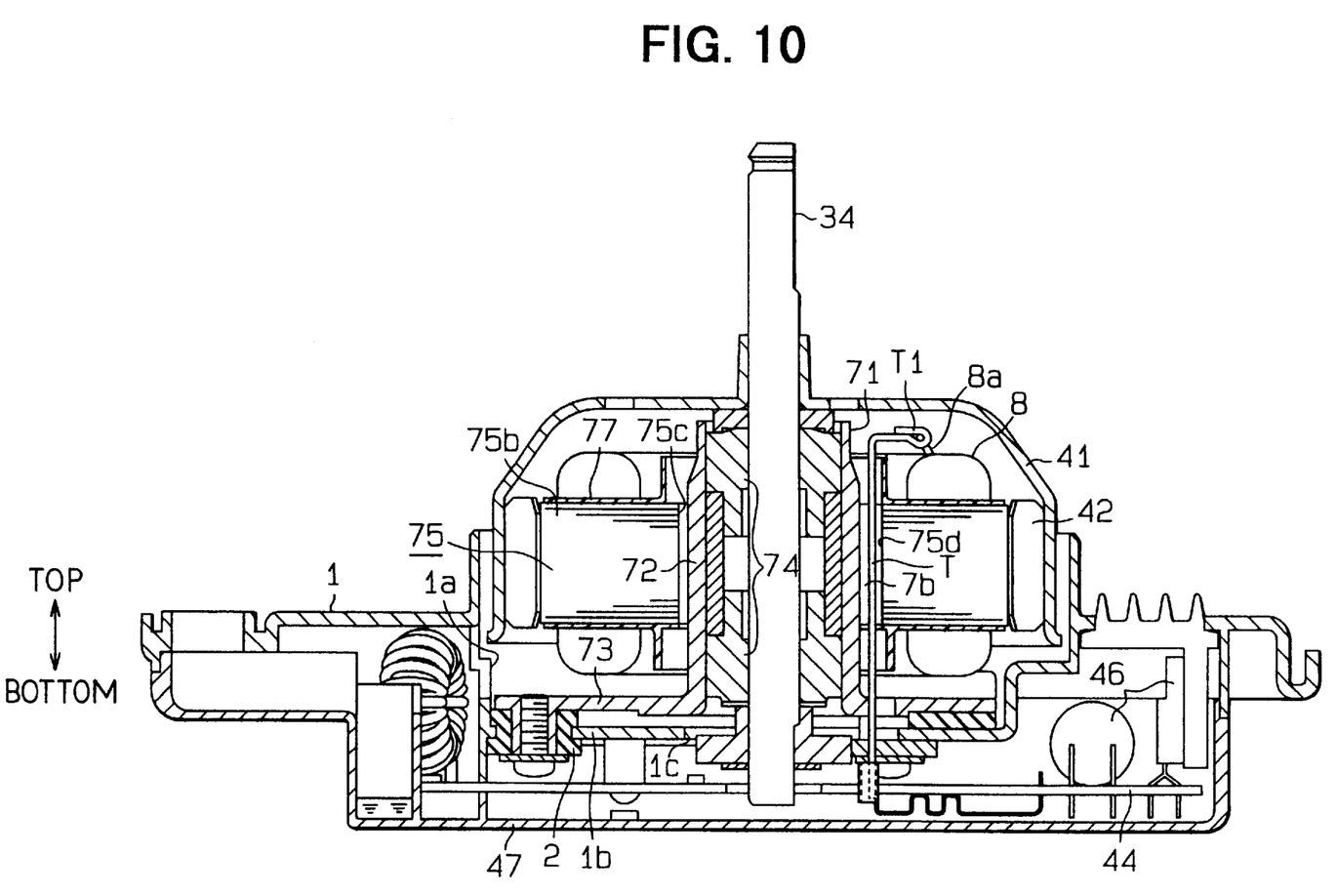
FIG. 10 is a schematic sectional view showing a brushless motor according to a third preferred embodiment of the present invention.
Figure 11:
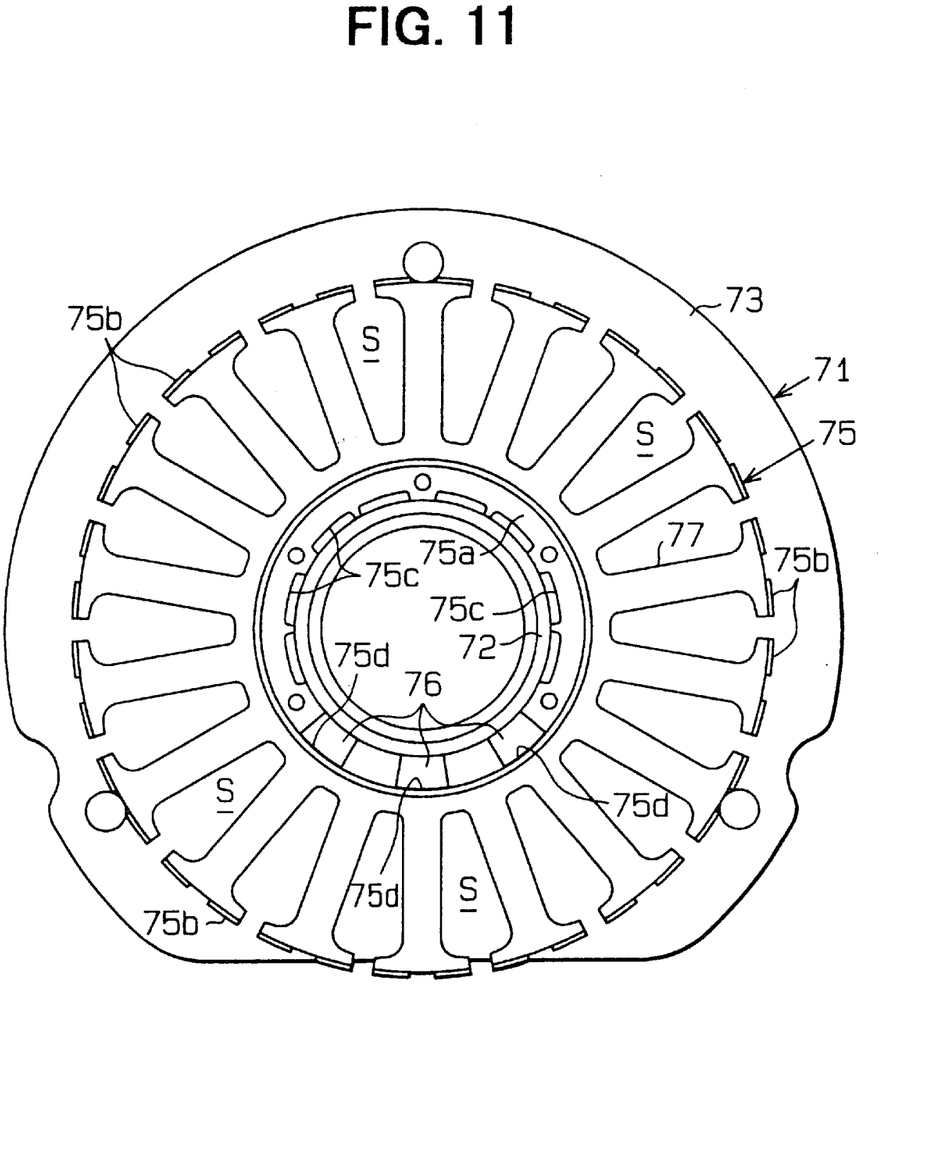
FIG. 11 is a plan view showing a center piece, a core and an insulator of the brushless motor according to the third embodiment.

As shown in FIG. 10, the center piece 71 is made of metal and is formed by pressing to have a cylindrical portion 72 and a flange portion 73 extending from a lower end of the cylindrical portion 72 outwardly in a radial direction of the cylindrical portion 72. The flange portion 73 is mounted to the bottom 1b of the accommodation portion 1a through the mounting members 2. In the third embodiment, the bottom 1b does not have the drain opening 1d. Upper and lower bearings 74 are attached to an inner circumferential wall of the cylindrical portion 72 so that the rotation shaft 34 is rotatably held by the bearings 74. The cylindrical portion 72 is press-fit into an opening of the core 75.

The core 75 is formed by laminating plural core sheets. As shown in FIG. 11, the core 75 has a cylindrical base portion 75a into which the cylindrical portion 72 is press-fit and plural tooth portions 75b extending at equal angles from an outer circumferential wall of the base portion 75a outwardly in a radial direction of the cylindrical portion 72. Plural ventilation recesses 75c are formed in an inner circumferential wall of the base portion 75, arranged in a circumferential direction of the base portion 75a. Each of the ventilation recesses 75c is formed to extend from an upper end to a lower end of the base portion 75a. When the cylindrical portion 72 is press-fit into the base portion 75a, the ventilation recesses 75c and an outer circumferential wall of the cylindrical portion 72 form plural ventilation holes extending from an upper end to a lower end of the core 75 in an axial direction of the core 75.

Further, three terminal insertion recesses 75d are formed in the inner circumferential wall of the base portion 75a, arranged in a circumferential direction of the base portion 75a. Each of the terminal insertion recesses 75d is formed to extend from an upper end to a lower end of the base portion 75a. Each depth of the terminal insertion recesses 75d is set larger than each depth of the ventilation recesses 75c. When the cylindrical portion 72 is press-fit into the base portion 75a, the terminal insertion recesses 75d and the outer circumferential wall of the cylindrical portion 72 form three insertion gaps 76 extending from an upper end to a lower end of the core 75 in an axial direction of the core 75. Each of the terminals T extends to an upper side of the core 75 through each of the insertion gaps 76 so that each of the connector portions T1 is connected to each of the winding ends 8a. In the third embodiment, each of the terminals T is covered by insulating material. Further, an insulator 77 which covers upper and lower surfaces of the core 75 and side walls of the core 75 which surrounds each of the slots S is fastened to the core 75.

According to the third embodiment, each of the terminals T extends to an upper side of the core 75 through each of the insertion gaps 76 so that each of the connector portions T1 is connected to each of the winding ends 8a above the core 75. Therefore, even when liquid enters the accommodation portion 1a, each of the connector portions T1 is restricted from making contact with liquid. As a result, short circuit between the adjacent connector portions T1 is restricted. Further, the center piece 71 has the cylindrical portion 72 press-fit into the core 75 and the flange portion 73 extending from the cylindrical portion 72 and fastened to the motor holder 1. Therefore, the center piece 71 and the core 51 are fastened to the motor holder 1 with the reduced number of parts.

In the first embodiment, even when each of the terminals T is extended to a lower side of the core 7 and radially outside the lower center piece 6 to be connected to each of the winding ends 8a, the same effect as in the first embodiment is obtained. Also, even when the O-ring X and/or the drain opening 1d is omitted, the same effect as in the first embodiment is obtained. Further, even when each of the terminals T is extended to a lower side of the core 7 and radially outside the lower center piece 6 to be connected to each of the winding ends 8a and the drain opening 1d is omitted, the same effect as in the first embodiment is obtained. Furthermore, each of the terminals T may be extended to a lower side of the core 7 and radially outside the lower center piece 6 to be connected to each of the winding ends 8a while the O-ring X is omitted. In this case, since liquid having entered the accommodation portion 1a is drained through the drain opening id outside the lower case 47, liquid is restricted from staying inside the accommodation portion 1a. Therefore, the terminals T and the winding ends 8a are restricted from making contact with liquid, and liquid is restricted from flowing downwardly through the through hole 1c.

The O-ring X may be replaced with any other member for restricting liquid from flowing downwardly through the through hole 1c. For example, a cylindrical portion extending upwardly from the upper surface 1g of the bottom 1b to surround the through hole 1c may be formed instead of the O-ring X.

Each of the winding ends 8a may be extended to a lower side of the lower center piece 6 through each of the terminal accommodation holes 18 to be connected to the exciting circuit 46. As a result, each of the windings 8 is connected to the exciting circuit 46 without being exposed outside the center pieces 6, and each connection portion between the windings 8 and the exciting circuit 46 is restricted from making contact with liquid.

A shape of the drain pipe 1e may be modified as long as liquid on the bottom 1b can be drained. For example, the drain pipe 1e may be bent to extend horizontally above the circuit substrate 44 to communicate with outside the lower case 47, while the circuit substrate 44 does not have the hole 44a.

The O-ring X or the drain opening 1d and the drain pipe 1e according to the first embodiment may be applied to the second or third embodiment. When the O-ring X is applied to the second or third embodiment, liquid is restricted from flowing downwardly through the through hole 1c toward the circuit substrate 44. When the drain pipe 1e is applied to the second or third embodiment, liquid having entered the accommodation portion 1a is drained outside. Further, each of the terminals T may be extended from a lower side to an upper side of the core 7, 55 or 75 through any other route within the core area. For example, each of the terminals T may be extended through an outer side portion of one of the slots S in a radial direction of the core 7, 55 or 75.

In the third embodiment, the terminals T may be not covered by insulating material when the terminals T are disposed not to make contact with the base portion 75a of the core 75 nor the cylindrical portion 72 of the center piece 71. Further, each of the terminals T may be held by a part of the insulator 77 such as a clip portion extending from a portion of the insulator 77 which covers an upper surface of the core 75. In the first through third embodiments, the waterproof wall 1f of the motor holder 1 may be omitted.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A brushless motor comprising:

a holder having a through hole;

a stator having a center piece fastened to an upper surface of the holder, a core fastened to an outer peripheral portion of the center piece and a winding wound on the core through an insulator;

a shaft rotatably held by an inner peripheral portion of the center piece;

a rotor disposed to cover the stator from above and rotatably centered on the rotation shaft by a magnetic field generated by the stator;

an exciting circuit disposed below the holder to supply an exciting current to the winding through the through hole of the holder, the exciting circuit having a terminal extending to an upper side of the core through a route within the core, the terminal having a connector portion formed at an upper part thereof and connectable to the winding; and a case disposed below the holder to accommodate the exciting circuit, wherein the holder has a drain opening through which a liquid on the upper surface of the holder is drained outside the case.

2. The brushless motor according to claim 1, wherein the rotor is formed into a cup shape.

3. The brushless motor according to claim 1, further comprising flow restriction means disposed on the holder for restricting a liquid from flowing downwardly through the through hole of the holder.

4. The brushless motor according to claim 1, wherein:

the center piece has a through hole extending in an axial direction thereof; and the terminal is extended to an upper side of the core through the through hole of the center piece.

5. The brushless motor according to claim 1, wherein:

the core has a slot extending in a radial direction of the core;

the insulator has a slot inner wall covering portion which covers a wall of the core defining an inner end of the slot in the radial direction of the core;

the slot inner wall covering portion has a through hole extending in an axial direction thereof; and the terminal is extended to an upper side of the core through the through hole of the slot inner wall covering portion.

6. The brushless motor according to claim 1, wherein:

the center piece includes an upper center piece having an upper center boss and a lower center piece having a lower center boss;

the insulator has an upper insulator extending from an outer circumferential surface of the upper center boss and having an upper recessed portion on a first side thereof, and a lower insulator extending from an outer circumferential surface of the lower center boss and having a lower recessed portion on a first side thereof;

the shaft is rotatably held by a bearing disposed in the upper and lower center bosses; and the core is accommodated in the upper and lower recessed portions so that the core is electrically insulated from the winding.

7. The brushless motor according to claim 1, wherein:

the center piece has a cylindrical portion and a flange portion extending from an end of the cylindrical portion outwardly in a radial direction of the cylindrical portion and fastened to the holder; and the core is fastened to an outer circumferential surface of the cylindrical portion.

8. The brushless motor according to claim 1, wherein:

the center piece has a cylindrical portion and a flange portion extending from an end of the cylindrical portion outwardly in a radial direction of the cylindrical portion and fastened to the holder;

the core is fastened to an outer circumferential surface of the cylindrical portion so that a gap extending in an axial direction of the cylindrical portion is formed between the core and the cylindrical portion; and the terminal is extended to an upper side of the core through the gap.

9. The brushless motor according to claim 1, wherein the winding has a winding end disposed at an upper side of the core.

10. A brushless motor comprising:

a holder having a through hole;

a stator having a center piece fastened to an upper surface of the holder, a core fastened to an outer peripheral portion of the center piece and a winding wound on the core;

a rotor disposed to cover the stator from above and rotated by a magnetic field generated by the stator;

an exciting circuit disposed below the holder to supply an exciting current to the winding through the through hole of the holder;

flow restriction means disposed on the holder for restricting a liquid from flowing downwardly through the through hole of the holder; and a case disposed below the holder to accommodate the exciting circuit, wherein the holder has a drain opening through which a liquid on the upper surface of the holder is drained outside the case.

11. The brushless motor according to claim 10, wherein the flow restriction means is a ring member disposed to surround the through hole of the holder.

12. The brushless motor according to claim 11, wherein the ring member is disposed between the upper surface of the holder and a lower end of the center piece to restrict the liquid from flowing downwardly through the through hole of the holder.

13. A brushless motor comprising:

a holder having a through hole;

a stator having a center piece fastened to an upper surface of the holder, a core fastened to an outer peripheral portion of the center piece and a winding wound on the core;

a rotor disposed to cover the stator from above and rotated by a magnetic field generated by the stator;

an exciting circuit disposed below the holder to supply an exciting current to the winding through the through hole of the holder; and a case disposed below the holder to accommodate the exciting circuit, wherein:

the holder has a drain opening through which a liquid on the upper surface of the holder is drained outside the case.

14. The brushless motor according to claim 13, further comprising a circuit substrate on which the exciting circuit is mounted, wherein the drain opening communicates with a space outside and below the case through the circuit substrate.

15. The brushless motor according to claim 14, wherein the exciting circuit has a terminal extending to an upper side of the core through a route within the core.

16. The brushless motor according to claim 13, wherein the winding is wound on the core through an insulator.

* * * * *

UNITED STATES PATENT AND TRADEMARK OFFICE
CERTIFICATE OF CORRECTION

PATENT NO.  : 6,333,576 B1
DATED       : December 25, 2001
INVENTOR(S) : Toshio Ishikawa and Mineo Yamaguchi It is certified that error appears in the above-identified patent and that said Letters Patent is hereby corrected as shown below:

<u>Title page,</u>
Item [73], change the assignee from "Asao Co., Ltd., Shizuoka (JP)" to -- Asmo Co., Ltd., Shizuoka (JP) --
Item [30], correct the second FOREIGN APPLICATION PRIORITY DATA, "12-136049" as -- "2000-136049" --

Signed and Sealed this

Twenty-eighth Day of May, 2002

Attest:

JAMES E. ROGAN
Attesting Officer
Director of the United States Patent and Trademark Office